United States Patent
Walstrom et al.

(10) Patent No.: US 11,858,649 B2
(45) Date of Patent: Jan. 2, 2024

(54) CONTROLLING MULTIPLE AIRCRAFT EXTERNAL POWER SOURCES WITH A SINGLE EXTERNAL POWER SWITCH

(71) Applicant: The Boeing Company, Chicago, IL (US)

(72) Inventors: Steven M. Walstrom, Lynnwood, WA (US); Sheverria Antony Aikens, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 458 days.

(21) Appl. No.: 16/781,450

(22) Filed: Feb. 4, 2020

(65) Prior Publication Data

US 2021/0237892 A1 Aug. 5, 2021

(51) Int. Cl.
 *B64D 41/00* (2006.01)
 *H02J 4/00* (2006.01)
 *G05B 15/02* (2006.01)

(52) U.S. Cl.
 CPC ............ *B64D 41/00* (2013.01); *G05B 15/02* (2013.01); *H02J 4/00* (2013.01); *B64D 2221/00* (2013.01)

(58) Field of Classification Search
 CPC .... B64D 41/00; B64D 2221/00; G05B 15/02; H02J 4/00; H02J 2310/44; B64F 1/362
 See application file for complete search history.

(56) References Cited

U.S. PATENT DOCUMENTS

| 5,630,142 A * | 5/1997 | Crump ................... G06F 1/325 714/24 |
| 2014/0184143 A1* | 7/2014 | Coakley ................. G06F 1/263 320/107 |
| 2015/0045976 A1* | 2/2015 | Li ....................... H02J 13/0017 700/295 |
| 2019/0036338 A1* | 1/2019 | Ettridge ................... H02J 3/38 |

* cited by examiner

*Primary Examiner* — Charles Cai
(74) *Attorney, Agent, or Firm* — Sage Patent Group

(57) ABSTRACT

A plurality of external power ("EP") sources can be controlled with a single EP switch. A plurality of EP states can be determined, each EP state of the plurality of EP states being associated with one EP source from the plurality of EP sources. A highest EP state of the plurality of EP states can be determined. An EP indicator of the EP switch can be controlled based on the highest EP state.

20 Claims, 7 Drawing Sheets

FIG. 3

| Beginning State | | Ending State | |
|---|---|---|---|
| Beginning L EP State | Beginning R EP State | Ending L EP State | Ending R EP State |
| OFF | OFF | OFF | OFF |
| OFF | AVAILABLE | OFF | GENERAL OPERATIONS |
| OFF | GROUND HANDLING | OFF | GENERAL OPERATIONS |
| OFF | GENERAL OPERATIONS | OFF | AVAILABLE or GROUND HANDLING* |
| AVAILABLE | OFF | GENERAL OPERATIONS | OFF |
| AVAILABLE | AVAILABLE | GENERAL OPERATIONS | GENERAL OPERATIONS |
| AVAILABLE | GROUND HANDLING | N/A** | N/A** |
| AVAILABLE | GENERAL OPERATIONS | AVAILABLE or GROUND HANDLING* | AVAILABLE or GROUND HANDLING* |
| GROUND HANDLING | OFF | GENERAL OPERATIONS | OFF |
| GROUND HANDLING | AVAILABLE | N/A** | N/A** |
| GROUND HANDLING | GENERAL OPERATIONS | N/A** | GENERAL OPERATIONS |
| GENERAL OPERATIONS | OFF | AVAILABLE or GROUND HANDLING* | N/A** |
| GENERAL OPERATIONS | AVAILABLE | AVAILABLE or GROUND HANDLING* | OFF |
| GENERAL OPERATIONS | GROUND HANDLING | N/A** | AVAILABLE or GROUND HANDLING* |
| GENERAL OPERATIONS | GENERAL OPERATIONS | AVAILABLE or GROUND HANDLING* | AVAILABLE or GROUND HANDLING* |

FIG. 4

| Beginning State | | Ending State | |
|---|---|---|---|
| Beginning L EP State | Beginning R EP State | Ending L EP State | Ending R EP State |
| OFF | OFF | OFF | OFF |
| OFF | AVAILABLE | AVAILABLE | AVAILABLE |
| OFF | GROUND HANDLING | GROUND HANDLING | GROUND HANDLING |
| OFF | GENERAL OPERATIONS | GENERAL OPERATIONS | GENERAL OPERATIONS |

| EP States | | Physical Switch Indication Lamp States | |
|---|---|---|---|
| Beginning L EP State | Beginning R EP State | AVAIL | ON |
| OFF | OFF | Extinguished | Extinguished |
| OFF | AVAILABLE | Illuminated | Extinguished |
| OFF | GROUND HANDLING | Illuminated | Extinguished |
| OFF | GENERAL OPERATIONS | Extinguished | Illuminated |
| AVAILABLE | OFF | Illuminated | Extinguished |
| AVAILABLE | AVAILABLE | Illuminated | Extinguished |
| AVAILABLE | GROUND HANDLING | N/A** | N/A** |
| AVAILABLE | GENERAL OPERATIONS | Extinguished | Illuminated |
| GROUND HANDLING | OFF | Illuminated | Extinguished |
| GROUND HANDLING | AVAILABLE | N/A** | N/A** |
| GROUND HANDLING | GROUND HANDLING | Illuminated | Extinguished |
| GROUND HANDLING | GENERAL OPERATIONS | N/A** | N/A** |
| GENERAL OPERATIONS | OFF | Extinguished | Illuminated |
| GENERAL OPERATIONS | AVAILABLE | Extinguished | Illuminated |
| GENERAL OPERATIONS | GROUND HANDLING | N/A** | N/A** |
| GENERAL OPERATIONS | GENERAL OPERATIONS | Extinguished | Illuminated |

FIG. 5

CONTROLLING MULTIPLE AIRCRAFT EXTERNAL POWER SOURCES WITH A SINGLE EXTERNAL POWER SWITCH

FIELD

The present disclosure is related to controlling external power sources. In particular, the present disclosure relates to controlling multiple aircraft external power sources with a single external power switch.

BACKGROUND

Electrical power systems in some aircraft have a physical switch on the flight deck for each external power ("EP") interface that can be coupled to an EP source. These physical switches can be referred to as EP switches and can include one or more indication lamps that are system controller-driven via control of the lamp ground path. Accordingly, increasing a number of EP sources that can be connected to an aircraft increases the number of EP switches required on a flight deck.

SUMMARY

In some embodiments, a method to control a plurality of external power ("EP") sources is provided. The method includes determining a plurality of EP states. Each EP state of the plurality of EP states is associated with one EP source from the plurality of EP sources. The method further includes determining a highest EP state of the plurality of EP states. The method further includes controlling an EP indicator of an EP switch based on the highest EP state.

In other embodiments, a method to control a plurality of external power ("EP") sources is provided. The method includes determining that an EP switch has transitioned between a first state and a second state. The method further includes, in response to determining the EP switch has transitioned between the first state and the second state, setting an EP state for each EP source from the plurality of EP sources. The method further includes controlling power distribution of the plurality of EP sources based on the EP state associated with each EP source from the plurality of EP sources.

In other embodiments, a method to control a plurality of external power ("EP") sources. The method includes determining a plurality of EP states. Each EP state of the plurality of EP states is associated with one EP source from the plurality of EP sources. The method further includes determining a highest EP state of the plurality of EP states. The method further includes determining that a first EP source from the plurality of EP sources has been plugged in. The method further includes, in response to determining that the first EP source has been plugged in, setting an EP state that is associated with the first EP source based on the highest EP state.

In other embodiments, a system to control a plurality of external power ("EP") sources is provided. The system includes an EP switch, processing circuitry, and memory. The EP switch includes an EP indicator. The memory is coupled to the processing circuitry and has instructions stored therein that are executable by the processing circuitry to cause the processing circuitry to perform operations. The operations include determining a plurality of EP states. Each EP state of the plurality of EP states is associated with one EP source from the plurality of EP sources. The operations further include determining a highest EP state of the plurality of EP states. The operations further include controlling the EP indicator based on the highest EP state.

In other embodiments, a system to control a plurality of external power ("EP") sources is provided. The system includes an EP switch, processing circuitry, and memory. The EP switch is configured to switch between a first state and a second state. The memory is coupled to the processing circuitry and has instructions stored therein that are executable by the processing circuitry to cause the processing circuitry to perform operations. The operations include determining that the EP switch has transitioned between the first state and the second state. The operations further include, in response to determining that the EP switch has transitioned between the first state and the second state, setting an EP state for each EP source from the plurality of EP sources. The operations further include controlling power distribution of the plurality of EP sources based on the EP state associated with each EP source from the plurality of EP sources.

In other embodiments, a system to control a plurality of external power ("EP") sources is provided. The system includes processing circuitry and memory. The memory is coupled to the processing circuitry and has instructions stored therein that are executable by the processing circuitry to cause the processing circuitry to perform operations. The operations include determining a plurality of EP states. Each EP state of the plurality of EP states being associated with one EP source from the plurality of EP sources. The operations further include determining a highest EP state of the plurality of EP states. The operations further include determining that a first EP source of the plurality of EP sources has been plugged in. The operations further include, responsive to determining that the first EP source has been plugged in, setting an EP state that is associated with the first EP source based on the highest EP state.

The features and functions can be achieved independently in various embodiments of the present disclosure or may be combined in yet other embodiments in which further details can be seen with reference to the following description and drawings.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a table illustrating examples of external power states for a pair of external power sources after an external power switch is plugged in according to some embodiments;

FIG. 4 is a table illustrating examples of external power states for a pair of external power sources after one external power source is plugged in according to some embodiments;

FIG. 5 is a table illustrating examples of external power switch indicator states corresponding to different external power states among multiple external power sources according to some embodiments;

DETAILED DESCRIPTION

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

Some aircrafts have multiple external power ("EP") interfaces to allow for multiple EP sources to be connected to the aircraft. Increasing the number of EP sources that can be connected to an aircraft can increase the number of EP switches required on a flight deck, which can reduce available space on the flight deck. Additional EP switches can also increase the complexity of controlling an EP system, which can increase the workload and training needs of flight crews.

Various embodiments herein describe using a single EP switch that is coupled to multiple onboard controllers, which are coupled to multiple EP sources to distribute power to onboard systems. Some embodiments herein are discussed in the context of an aircraft, but a single physical EP switch can be used to control multiple EP source for any suitable application including other vehicles (e.g., cars, trucks, buses, boats) and other applications that involve the control of multiple EP sources. In some embodiments, the use of a single EP switch allows for control of multiple external power sources in a clear and unambiguous manner by an operator on board a vehicle (e.g., an aircraft). In additional or alternative embodiments, the use of a single EP switch reduces physical space requirements and reduces crew workload and training.

The term EP source is used herein to describe an actual source of power and/or an EP interface of an aircraft that can be connected to a source of power. An EP source may be configured to be in one of a number of EP states. For example, the EP source may be in an EP state in which the EP source provides power to an aircraft (e.g., connected to the aircraft and turned on); the EP source may be in an EP state in which the EP source is available to provide power to the aircraft (e.g., connected to the aircraft but turned off); or the EP source may be in an EP state in which the EP source is unavailable to provide power to the aircraft (e.g., disconnected from the aircraft).

Figure 1:
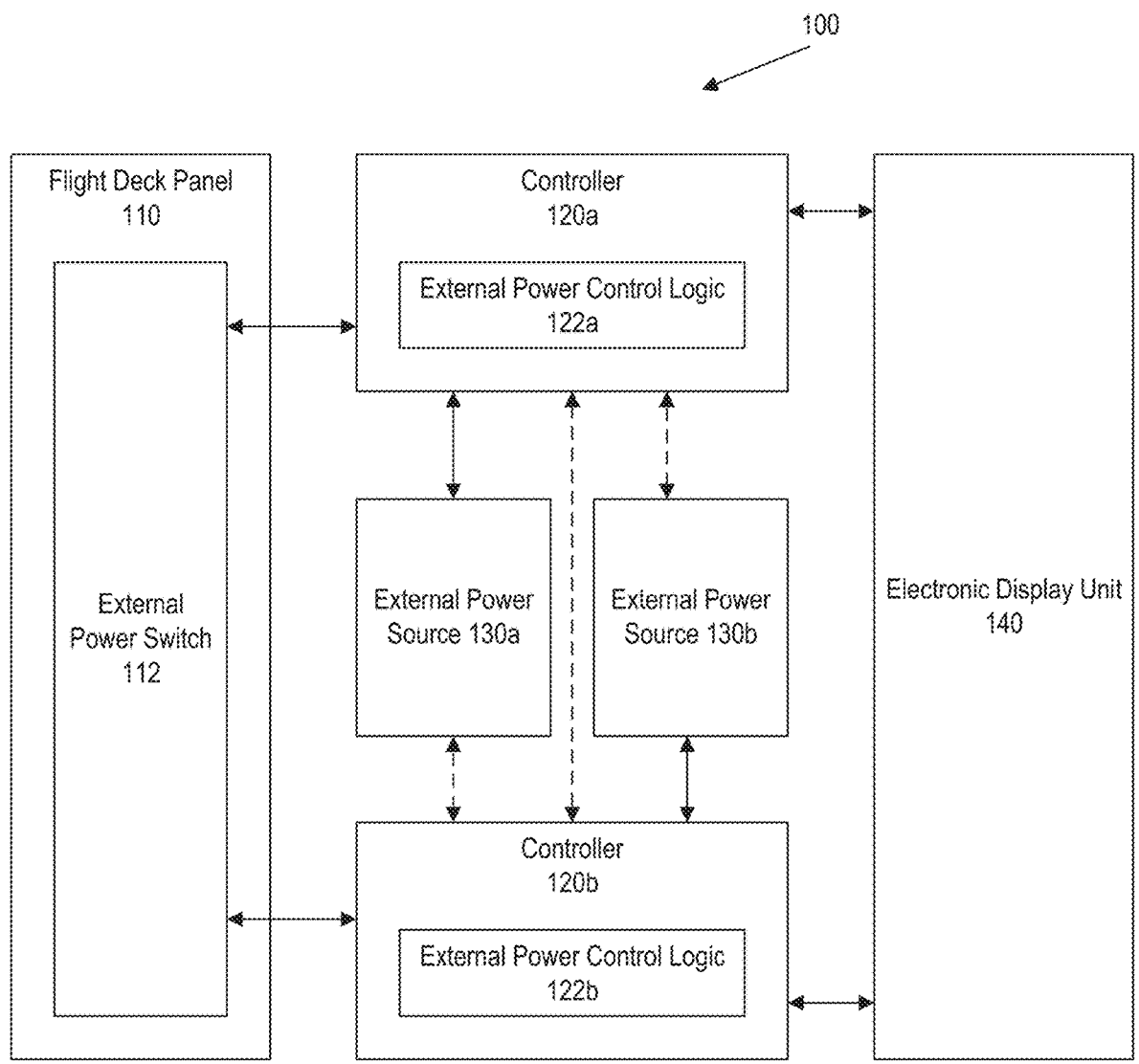
FIG. 1 is a block diagram illustrating an example of a system to control multiple external power sources with a single external power switch according to some embodiments.

FIG. 1 is a block diagram illustrating an example of an EP system 100 to control multiple EP sources 130a-b with a single EP switch 112. In this example, the EP system 100 includes the EP switch 112 in a flight deck panel 110, EP controllers 120a-b, and electronic display unit 140 to control EP sources 130a-b. The single EP switch 112 may control EP sources 130a-b via EP controllers 120a-b and may display an indication of an EP state of the EP sources 130a-b.

The EP controllers 120a-b are each coupled to the EP power switch 112 and the electronic display unit 140 for receiving instructions on how to handle the EP sources 130a-b and for communicating information regarding an EP state of the EP sources 130a-b, respectively. In this example, EP controller 120a is coupled to EP source 130a for controlling EP source 130a and determining an EP state of the EP source 130a. EP controller 120b is coupled to EP source 130b for controlling EP source 130b and determining an EP state of the EP source 130b. As indicated by the dashed lines, in some embodiments, EP controller 120a is communicatively coupled to EP controller 120b for exchanging information regarding EP states of their corresponding EP sources 130a-b. In additional or alternative embodiments, EP controller 120a is communicatively coupled to EP source 130b (in addition to EP source 130a) to determine an EP state of EP source 130b and EP controller 120b is communicatively coupled to EP source 130a (in addition to EP source 130b) to determine an EP state of EP source 130a. In additional or alternative embodiments, EP controller 120a is communicatively coupled to EP source 130b (in addition to EP source 130a) to provide secondary control of EP source 130b (e.g., in case of EP controller 120b failure) and EP controller 120b is communicatively coupled to EP source 130a (in addition to EP source 130b) to provide secondary control of EP source 130a (e.g., in case of EP controller 120a failure).

In some embodiments, EP controllers 120a-b include a sensor for sensing if a plug corresponding to an actual source of power associated with EP sources 130a-b is connected (e.g., plugged in).

In some embodiments, EP controllers 120a-b include a control unit, a system controller, a bus power control unit, a generator control unit, and an electrical load management system controller. The EP controllers 120a-b enable multiple power bus circuits to direct power distribution to multiple electrical systems within the aircraft depending on available EP sources and a preset hierarchy based on the electrical systems power priorities without re-activating (e.g., pressing the EP switch 112). For example, if EP source 130a is connected and EP source 130b is disconnected, then when EP source 130b is connected to the aircraft, an EP state associated with the EP source 130b is set to match the EP state of EP source 130a without user interaction.

In some embodiments, the EP switch 112 is configured to display a predetermined indication based on the EP state of each of the EP sources 130a-b. In some examples, the EP switch 112 includes an on indicator and an available indicator (e.g., a lamp that illuminates the term "ON" and a lamp that illuminates the term "AVAIL"). The on indicator and the available indicator reflect a highest EP state of the EP sources. The EP states may be ranked such that "On for General Operations" (for which the on indicator is illuminated) is greater than "On for Ground Handling" (for which the available indicator is illuminated) is greater than "Available" (for which the available indicator is illuminated) is greater than "Off" (for which no indicator is illuminated).

In additional or alternative embodiments, operation of the EP switch 112 is based on a state of an EP switch indicator prior to switching (e.g., pressing) the EP switch 112. For example, if the EP switch indictor displays an on state (e.g., "ON" indicator illuminated) prior to pressing the EP switch, then connected EP sources will be placed in an available state as a result of pressing the switch. Accordingly, the state of the EP switch indicator would display an avail state (e.g., "AVAIL" indicator illuminated) after pressing the switch.

In additional or alternative embodiments, an EP system avoids race conditions and an appearance of the system not responding to crew actions by switching the EP state of a first EP source with the highest EP state and setting an EP state for each other EP source to be the same as the first EP source. This is in contrast to a situation in which, if one EP source is "On for General Operations" and another EP source is "Available," the result of pressing the EP switch would be for an ON indicator to remain illuminated as one EP source would switch to available and the other would switch to on.

In additional or alternative embodiments, the EP system avoids driving both an ON and AVAIL indication lamp of an EP switch at the same time, as it can be an unclear/invalid indication to the crew. The EP system also avoids failing to correctly drive any physical switch indication lamps if a system controller fails.

In some embodiments, the electronic display unit 140 includes a user interface (e.g., a digital display) that displays individual EP states for each of the EP sources 130a-b. The user interface also receives user input requesting changes in the EP state of a specific EP source or both of the EP sources 120a-120b. The electronic display unit 140 transmits instructions to one or both of the EP controllers 120a-b to cause the change in EP state. In some embodiments, the electronic display unit 140 is part of the flight deck panel 110. In additional or alternative embodiments, an electronic display unit is independent from the flight deck panel. In some examples, the electronic display unit is external to the aircraft and usable by ground crews or maintenance crews to individually control the EP sources 130a-b. In additional or alternative examples, the electronic display unit is part of an external device such as a maintenance laptop. In additional or alternative embodiments, an EP system does not include the electronic display unit 140.

Although the EP system 100 is depicted as including the EP switch 112 in the flight deck panel 110, EP controllers 120a-b, and electronic display unit 140 to control EP sources 130a-b, other implementations are possible. For example, in alternative embodiments, an EP system includes just an EP switch and any number of EP controllers for controlling any number of EP sources. In additional or alternative embodiments, the EP switch is not located on the flight deck.

Figure 2:
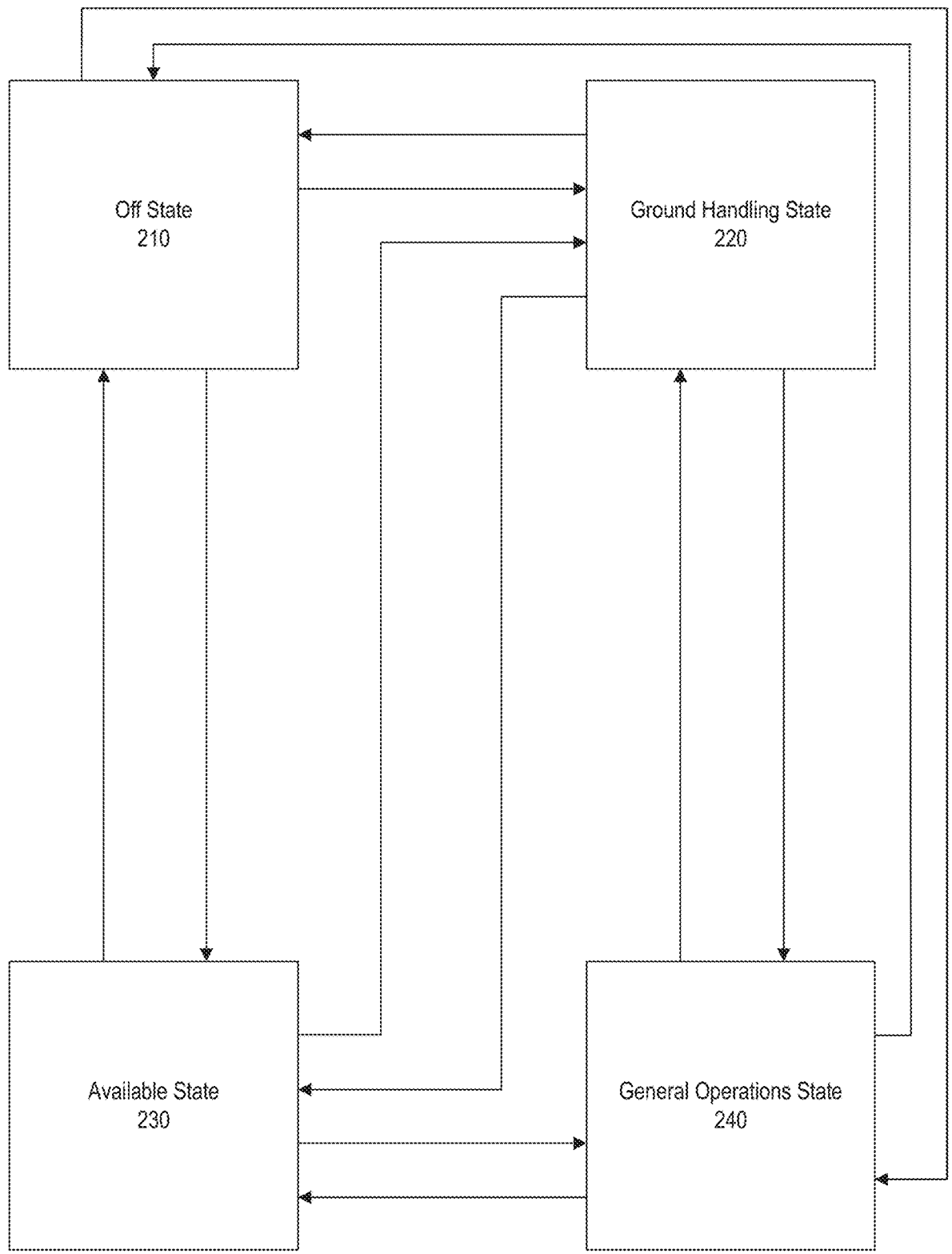
FIG. 2 is a state diagram illustrating an example of external power states according to some embodiments.

FIG. 2 is a state diagram illustrating an example of EP states. In this example, there are four states: an off state 210, an available state 230, a ground handling state 220, and a general operations state 240.

The off state 210 refers to an EP state of an EP source that is not plugged in or that has a power quality below a threshold limit (e.g., not within no-trip limits).

The available state 230 is an EP state of an EP source that is plugged in (e.g., connected to an actual source of power) and has a power quality that meets a threshold limit (e.g., within steady-state no-trip limits), but for which an EP controller has not caused a closed circuit to form (e.g., not powering any buses).

The ground handling state 220 is an EP state of an EP source that is plugged in (e.g., connected to an actual source of power), has a power quality that meets a threshold limit (e.g., within steady-state no-trip limits), and for which an EP controller has caused a closed circuit to form to thereby power ground handling loads (e.g., buses powered, loads shed down to needed for ground handling).

The general operations state 240 is an EP state of an EP source that is plugged in (e.g., connected to an actual source of power), has a power quality that meets a threshold limit (e.g., within steady-state no-trip limits), and for which an EP controller has caused a closed circuit to form due to crew commanding ground power on (e.g., either via the physical EP switch or the electronic display unit).

When an EP source is plugged in, the EP source can automatically be put into the same EP state as another EP source that is plugged in and has the highest EP state of plugged-in EP sources. In some embodiments, the off state 210 transitions to the available state 230 in response to a corresponding EP source being plugged in and a generator source being already online powering buses. The off state 210 transitions to the ground handling state 220 in response to (1) the corresponding EP source being plugged in and no sources being online providing power or (2) the corresponding EP source being plugged in and another EP source being in the ground handling state 220. The off state 210 transitions to the general operations state 240 in response to the corresponding EP source being plugged in and another EP source being in the general operations state 240.

In some embodiments, an EP source in the available state 230 transitions to the off state 210 in response to the EP source being unplugged/disconnected, the EP source being tripped off (e.g., power quality falling below a threshold level), or the ground power unit being turned off. The EP source in the available state 230 transitions to the ground handling state 220 in response to the last generator source being commanded offline such that there are no generators available to power AC buses. The EP source in the available state 230 transitions to the general operations state 240 in response to the associated electronic display unit interface button being pressed or in response to the EP switch being pressed and another EP source not being in a general operations state (such that all connected EP sources are commanded on). In some examples, if two EP sources are both in the available state 230 when the EP switch is pressed, both would transition to the general operations state 240. In additional or alternative examples, if a first EP source is in a general operations state 240 and a second EP source is in an available state 230, the second EP source is not transitioned to the general operations state 240. Instead, the first EP source is transitioned to the available state 230. In alternative examples, the first EP source may be prevented from transitioning to the available state 230, and the second EP source may transition to the general operations state 240.

In some embodiments, an EP source in the ground handling state 220 transitions to the off state 210 in response to the EP source being unplugged/disconnected, the EP source being tripped off (e.g., power quality falling below a threshold level), or the ground power unit being turned off. The EP source in the ground handling state 220 transitions to the available state 230 in response to another EP source that was in the ground handling state being commanded on by its associated electronic display unit button being pressed or a generator source that is commanded on. The EP source in the ground handling state 220 transitions to the general operations state 240 in response to (1) the EP source's associated electronic display unit button being pressed or (2) the EP switch being pressed and another EP source not being in a general operations state 240 (such that all connected EP sources are commanded on).

In some embodiments, an EP source in the general operations state 240 transitions to the off state 210 in response to the EP source being unplugged/disconnected, the EP source being tripped off (e.g., power quality falling below a threshold level), or the ground power unit being turned off. The EP source in the general operations state 240 transitions to the available state 230 in response to (1) a generator source being commanded on, (2) the EP source's associated electronic display unit button being pressed and a generator source being available to power AC buses or another EP source being in a general operations state 240, or (3) the EP switch being pressed and a generator source being available to power AC buses such that all connected EP sources are set to the available state 230. In some examples, if two EP sources are in the general operations state 240 and the EP switch is pressed, both EP sources will transition to the available state 230. The EP source in the general operations state 240 transitions to the ground handling state 220 in response to (1) the EP's associated electronic display unit button being pressed and no generator sources being available to power AC buses and no other EP source being in the general operations state 240, or (2) the EP switch being pressed and no generator sources being available to power AC buses.

There can be less or more EP states. For example, in some alternative embodiments, an available state can encompass available state 230 and ground handling state 220.

FIG. 3 is a table illustrating examples of EP states for a pair of EP sources in response to an EP switch being pressed.

FIG. 4 is a table illustrating examples of EP states for a pair of EP sources after one EP source is plugged in.

FIG. 5 is a table illustrating examples of EP switch indicator states corresponding to different EP states among multiple EP sources.

Figures 6A, 6B:
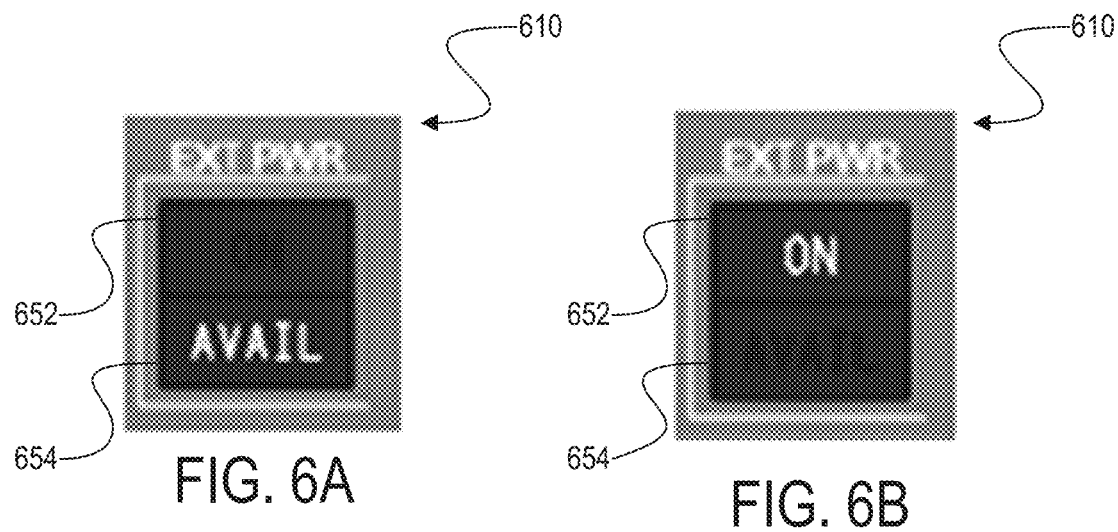
FIGS. 6A-B are schematic diagrams illustrating examples of an external power switch according to some embodiments.

FIGS. 6A-B are schematic diagrams illustrating examples of an EP switch 610. FIG. 6A depicts an example of EP switch 610 with an on lamp 652 extinguished and an available lamp 654 illuminated. Accordingly, in FIG. 6A, EP switch 610 indicates that one or more EP sources are connected and available, but not are in an "ON" state. Pressing the EP switch 610 in FIG. 6A would cause the EP switch indicators 652, 654 to switch to the state as illustrated in FIG. 6B, as well as cause the power controllers to switch the EP state of connected EP sources to an "ON" state.

FIG. 6B depicts an example of EP switch 610 with on lamp 652 illuminated and available lamp 654 extinguished. Accordingly, in FIG. 6B EP, switch 610 indicates that at least one of the one or more EP sources that are connected is in an "ON" state. Pressing the EP switch 610 in FIG. 6B would cause the EP switch indicators 652, 654 to switch to the state as illustrated in FIG. 6A, as well as cause the power controllers to switch the EP state of any EP sources in an "ON" state to an "Available" state.

Although not illustrated in FIGS. 6A-B, both EP switch indicators 652, 654 of EP switch 610 can be extinguished in response to no EP sources being connected with a power quality within no-trip limits.

Figure 7:
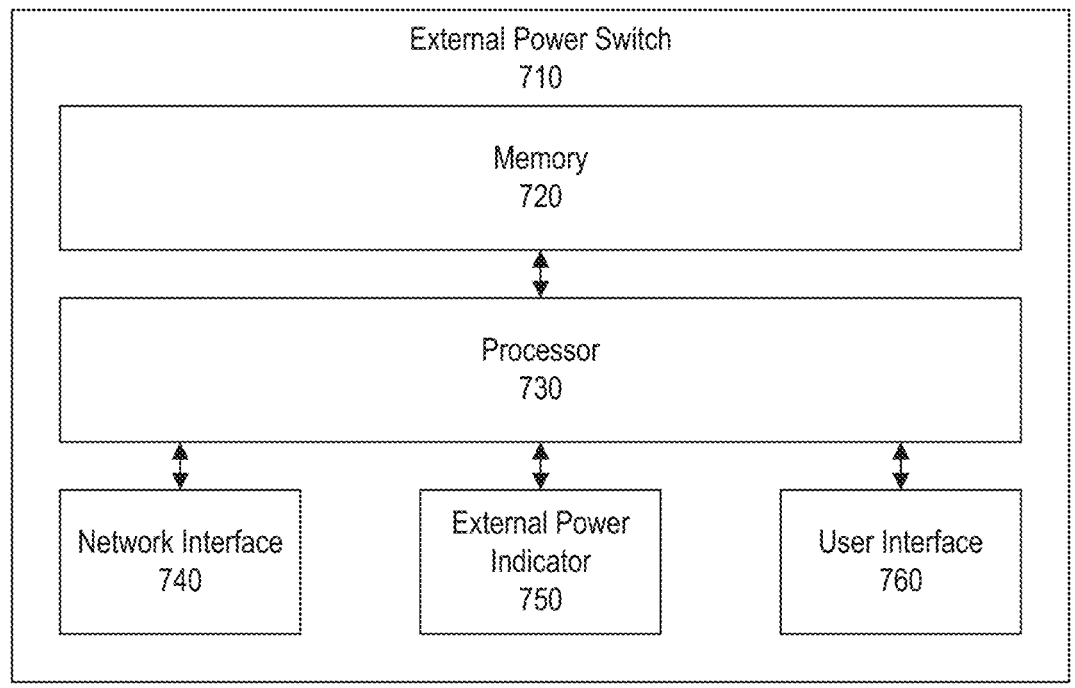
FIG. 7 is a block diagram illustrating an example of an external power switch according to some embodiments.

FIG. 7 is a block diagram illustrating an example of an EP switch 710. As illustrated, EP switch includes a processor 730 communicatively coupled with memory 720, network interface 740, EP indicator 750, and user interface 760.

The memory 720 may include computer-readable program code that, when executed by the processor 730, causes the processor 730 to perform operations according to embodiments disclosed herein. According to other embodiments, processor 730 may be defined to include memory, so that separate memory is not required.

As discussed herein, operations of the EP switch 710 may be performed by processor 730 and EP indicator 750. For example, processor 730 controls EP indicator 750 to display an "ON" or an "AVAIL" indicator (e.g., 652, 654 of FIGS. 6A-B) based on an EP state of one or more EP sources. In additional or alternative examples, processor 730 transmits instructions, via network interface 740, to power controllers controlling the one or more EP sources, the instructions being based on detecting user input via user interface 760. Moreover, modules may be stored in memory 720, and these modules may provide instructions, so that when instructions of a module are executed by processor 730, processor 730 performs respective operations (e.g., operations discussed below with respect to FIG. 10).

Although FIG. 7 illustrates the EP switch 710 as being a "smart" switch with processor 730, other implementations are possible. In some examples, an EP switch is a momentary action switch that is an open circuit when released and a closed circuit when pressed. The EP switch includes system-driven indication lamps for "ON" and "AVAIL." A first EP controller is a master EP controller for driving lamp indications of the EP switch, and a second EP controller is a backup. The master EP controller uses information about EP states for all EP sources to drive the indications. If the master EP controller is failing, the second EP controller uses information about EP states for all EP sources other than the EP source managed by the master EP controller.

Figure 8:
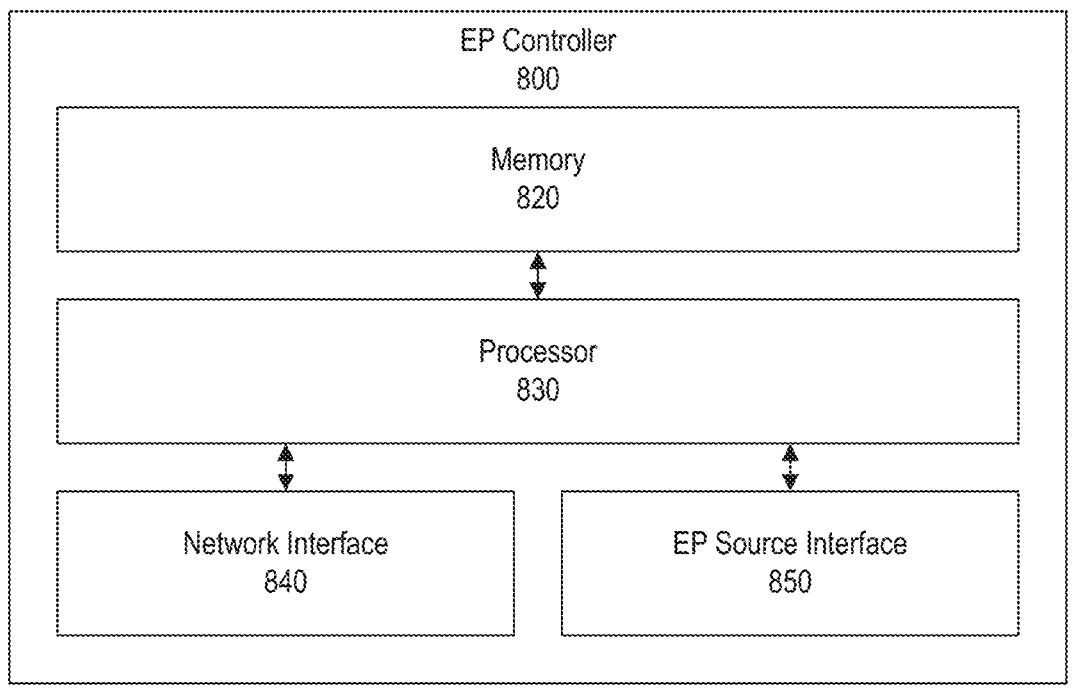
FIG. 8 is a block diagram illustrating an example of an EP controller according to some embodiments.

FIG. 8 is a block diagram illustrating an example of an EP controller 800. As illustrated, the EP controller 800 includes a processor 830 communicatively coupled with memory 820, network interface 840, and EP source interface 850. The memory 820 may include computer-readable program code that, when executed by the processor 830, causes the processor 830 to perform operations according to embodiments disclosed herein. According to other embodiments, processor 830 may be defined to include memory, so that separate memory is not required.

As discussed herein, operations of the EP controller 800 may be performed by processor 830. For example, processor 830 determines an EP state of a first EP source via EP source interface 850, determines an EP state of a second EP source from another EP controller via the network interface 840, and causes an EP switch indicator to display information based on the EP states. In some embodiments, processor 830 controls the EP switch indicator via the network interface 840. In additional or alternative embodiments, processor 830 informs a processor in the EP switch (e.g., processor 730 of EP switch 710 in FIG. 7) about one or more EP states via network interface 840. In additional or alternative embodiments, processor 830 controls distribution of power from an EP source based on the EP state. In additional or alternative embodiments, processor 830 changes a state of an EP source based on receiving indication, via network interface 840, that the EP switch was pressed. Moreover, modules may be stored in memory 820, and these modules may provide instructions, so that when instructions of a module are executed by processor 830, processor 830 performs respective operations (e.g., operations discussed below with respect to FIG. 10).

Figure 9:
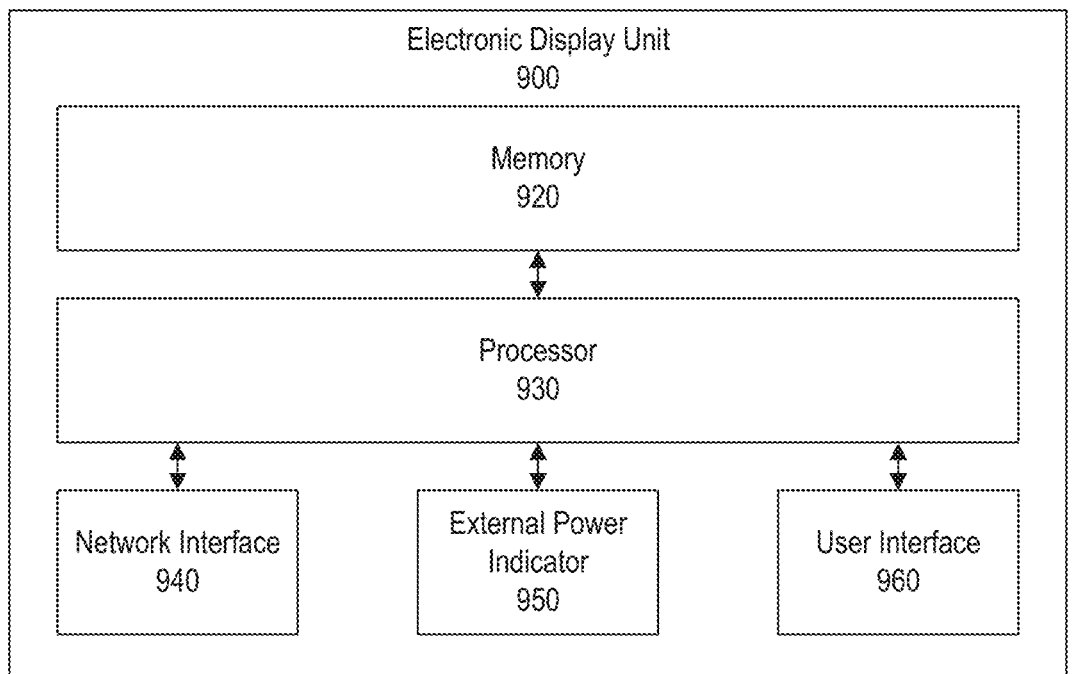
FIG. 9 is a block diagram illustrating an example of an electronic display unit according to some embodiments.

FIG. 9 is a block diagram illustrating an example of an electronic display unit 900. As illustrated, the electronic display unit 900 includes a processor 930 communicatively coupled with memory 920, network interface 940, EP indicator 950, and user interface 960. The memory 920 may include computer-readable program code that, when executed by the processor 930, causes the processor 930 to perform operations according to embodiments disclosed herein. According to other embodiments, processor 930 may be defined to include memory, so that separate memory is not required.

As discussed herein, operations of the electronic display unit 900 may be performed by processor 930, EP indicator 950, and user interface 960. For example, processor 930 receives EP state information for individual EP sources, via network interface 940, and displays the EP state information via the EP indicator 950. In some embodiments, the EP indicator 950 is part of the user interface 960. In additional or alternative embodiments, processor 930 receives user input, via user interface 960, requesting a change in EP state to a specific EP source. Processor 930 causes the change in EP state by transmitting instructions to one or more EP controllers via network interface 940. Moreover, modules may be stored in memory 920, and these modules may provide instructions, so that when instructions of a module are executed by processor 930, processor 930 performs respective operations (e.g., operations discussed below with respect to FIG. 10).

Figure 10:
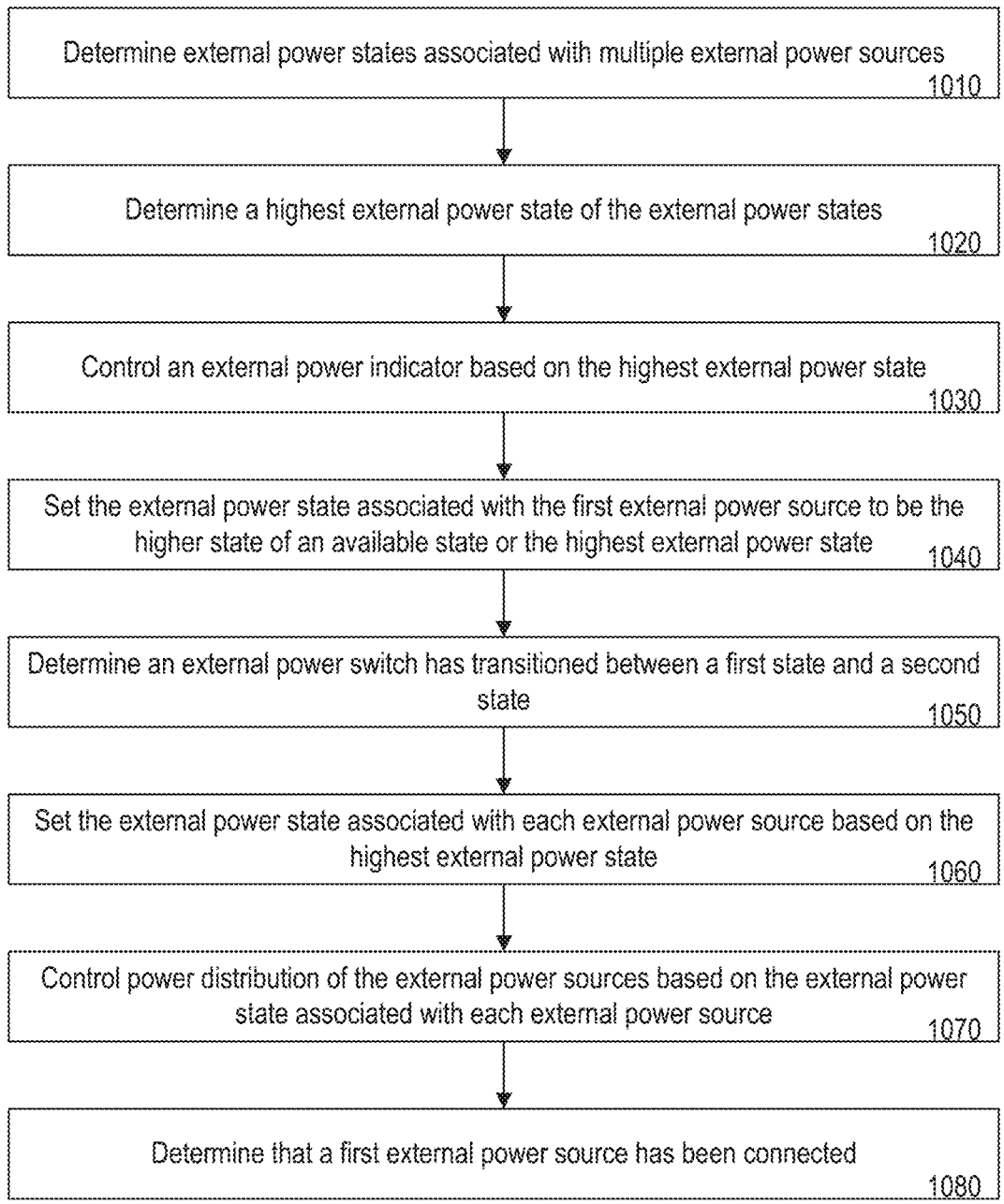
FIG. 10 is a flow chart illustrating an example of a process for controlling multiple external power sources with a single external power switch.

FIG. 10 is a flow chart illustrating an example of a process for controlling multiple external power sources with a single external power switch. The process can be performed by one or more processors in an EP system. FIG. 10 is described below as performed by processor 730 of EP switch 710, however, other implementations are possible. In some embodiments, the process is performed by processor 830 of EP controller 800. In additional or alternative embodiments, the process is split between processors of multiple controllers and processor 730 of EP switch 710.

At block 1010, processor 730 determines EP states associated with multiple EP sources. In some embodiments, each EP state is one of: an off state; an available state; a ground handling state; or a general operations state. The general operations state is a higher state than the ground handling state, which is a higher state than the available state, which is a higher state than the off state. The off state indicates an associated EP source is not plugged in or has a power quality that is outside a no-trip limit. The available state indicates that an associated EP source is plugged in, has a power quality that is within the no-trip limit, and has no load. The ground handling state indicates that an associated EP source is plugged in, has a power quality within the no-trip limit, and is powering ground handling. The general operations state indicates an associated EP source is plugged in, has a power quality within the no-trip limit, and is powering general operations.

At block 1020, processor 730 determines a highest EP state of the EP states.

At block 1030, processor 730 controls an EP indicator based on the highest EP power state. In some embodiments, the EP indicator includes an "ON" indication and an "Available" indication. The ON indication is illuminated to indicate that at least one of the EP sources is in a general operations state. The Available indication is illuminated to indicate that none of the EP sources are in a general operations state and that at least one of the EP sources is in an available state or in a ground handling state. In additional or alternative embodiments, controlling the EP indicator based on the highest EP state includes illuminating and/or extinguishing the ON indication and/or the Available indication based on the EP states. In additional or alternative embodiments, the ON indicator is an ON lamp and the Available indicator is an AVAIL lamp.

At block 1040, processor 730 sets the EP state associated with the first EP source to be the higher state of an available state or the highest EP state. In some embodiments, in response to the highest EP state of the EP states being the general operations state, the processor 730 sets the EP state associated with each EP source that is connected (e.g., plugged in) to the available state or the ground handling state. In additional or alternative embodiments, in response to the highest EP state of the EP states being the available state or the ground handling state, processor 730 sets the EP state associated with each EP source that is connected to the general operations state.

At block 1050, processor 730 determines an EP switch has transitioned between a first state and a second state. In some embodiments, the EP switch is a physical switch that is toggled between two states based on user input. In additional or alternative embodiments, the EP switch is a momentary switch that is in a first state when unpushed, in a second state while pushed, and returns to the first state.

At block 1060, processor 730 sets the EP state associated with each EP source that is plugged in based on the highest EP state. In some embodiments, processor 730 sets the EP state associated with each EP source that is plugged in based on the highest EP state in response to determining that the EP switch has transitioned between the first state and the second state. In additional or alternative embodiments, processor 730 sets the EP state associated with each EP source that is plugged in based on the highest EP state in response to an EP source being connected.

At block 1070, processor 730 controls power distribution of the EP sources based on the EP state associated with each EP source. In some embodiments, controlling the power distribution of the EP sources includes controlling a plurality of controllers to enable power bus circuits to direct power distribution to electrical systems based on EP states that are each associated with one EP source. The controllers include a control unit, a system controller, a bus power control unit, a generator control unit, and an electrical load management system controller.

At block 1080, processor 730 determines that a first EP source has been connected (e.g., plugged in). In some embodiments, processor 730 receives a signal from a plug sensor. In additional or alternative embodiments, the first EP source being plugged in completes a circuit that is detectable by the processor 730.

In some embodiments, the EP sources are EP sources for an aircraft, and the EP switch is a single physical EP switch in the aircraft.

Various operations from the flow chart of FIG. 10 may be optional with respect to some embodiments of EP systems and related methods. In some embodiments, blocks 1040, 1050, 1060, 1070, and 1080 of FIG. 10 are optional. In alternative embodiments, blocks 1010, 1020, 1030, 1040, and 1080 are optional. In alternative embodiments, blocks 1030, 1040, 1050, and 1070 are optional.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The invention claimed is:

1. A method to control a plurality of external power ("EP") sources, the method comprising:

determining a plurality of EP states, each EP state of the plurality of EP states being associated with one EP source from the plurality of EP sources;

determining a highest EP state of the plurality of EP states; and controlling an EP indicator of an EP switch based on the highest EP state, wherein the plurality of EP sources are each capable of being in an off state, an available state, a ground handling state, and a general operations state, and wherein the general operations state is a higher state than the ground handling state, which is a higher state than the available state, which is a higher state than the off state.

2. The method of claim 1, wherein each EP state of the plurality of EP states comprises one of: the off state; the available state; the ground handling state; or the general operations state, wherein the off state indicates an associated EP source is not plugged in or has a power quality that is outside a no-trip limit, wherein the available state indicates that an associated EP source is plugged in, has a power quality that is within the no-trip limit, and has no load, wherein the ground handling state indicates that an associated EP source is plugged in, has a power quality within the no-trip limit, and is powering ground handling, and wherein the general operations state indicates an associated EP source is plugged in, has a power quality within the no-trip limit, and is powering general operations.

3. The method of claim 2, wherein the EP switch switches between a first state and a second state, the method further comprising:

determining the EP switch has transitioned between the first state and the second state; and in response to determining the EP switch has transitioned between the first state and the second state, setting the EP state associated with each EP source, of the plurality of EP sources that are plugged in, based on the highest EP state of the plurality of EP states, wherein in response to the highest EP state of the plurality of EP states being the general operations state, setting the EP state associated with each EP source, of the plurality of EP sources that are plugged in, to the available state or the ground handling state, and wherein in response to the highest EP state of the plurality of EP states being the available state or the ground handling state, setting the EP state associated with each EP source, of the plurality of EP sources that are plugged in, to the general operations state.

4. The method of claim 3, further comprising, in response to setting the EP state associated with each EP source, of the plurality of EP sources that are plugged in, based on the highest EP state of the plurality of EP states:

controlling power distribution of the plurality of EP sources based on the EP state associated with each EP source from the plurality of EP sources.

5. The method of claim 4, wherein controlling the power distribution of the plurality of EP sources comprises controlling a plurality of controllers to enable a plurality of power bus circuits to direct power distribution to a plurality of electrical systems based on a plurality of EP states that are each associated with one EP source from the plurality of EP sources, and wherein the plurality of controllers comprise a control unit, a system controller, a bus power control unit, a generator control unit, and an electrical load management system controller.

6. The method of claim 1, wherein the EP indicator comprises:

an on indication that is illuminated to indicate that at least one of the plurality of EP sources is in a general operations state; and an available indication that is illuminated to indicate that none of the plurality of EP sources are in a general operations state and that at least one of the plurality of EP sources is in an available state or in a ground handling state, wherein controlling the EP indicator based on the highest EP state comprises illuminating or extinguishing the on indication or the available indication based on the plurality of EP states.

7. The method of claim 1, further comprising:

determining that a first EP source of the plurality of EP sources has been plugged in; and in response to determining that the first EP source has been plugged in, setting the EP state that is associated with the first EP source to be the higher state of an available state or the highest EP state.

8. The method of claim 1, wherein the plurality of EP sources comprise a plurality of EP sources for an aircraft, wherein the EP switch comprises a single EP switch in the aircraft, and wherein the EP indicator of the EP switch is in the aircraft.

9. A method to control a plurality of external power ("EP") sources, the method comprising:

determining that an EP switch has transitioned between a first state and a second state;

in response to determining the EP switch has transitioned between the first state and the second state, setting an EP state for each EP source from the plurality of EP sources; and controlling power distribution of the plurality of EP sources based on the EP state associated with each EP source from the plurality of EP sources based on a highest EP state of the plurality of EP states, wherein the plurality of EP sources are each capable of being in an off state, an available state, a ground handling state, and a general operations state.

10. The method of claim 9, wherein the EP switch comprises an EP indicator, the method further comprising:

determining a plurality of EP states, each EP state of the plurality of EP states being associated with one EP source from the plurality of EP sources;

determining the highest EP state of the plurality of EP states; and controlling the EP indicator based on the highest EP state, wherein the EP state for each EP source from the plurality of EP sources comprises one of: the off state; the available state; the ground handling state; or the general operations state, wherein the general operations state is a higher state than the ground handling state, which is a higher state than the available state, which is a higher state than the off state, wherein the off state indicates an associated EP source is not plugged in or has a power quality that is outside a no-trip limit, wherein the available state indicates that an associated EP source is plugged in, has a power quality that is within the no-trip limit, and has no load, wherein the ground handling state indicates that an associated EP source is plugged in, has a power quality within the no-trip limit, and is powering ground handling, and wherein the general operations state indicates an associated EP source is plugged in, has a power quality within the no-trip limit, and is powering general operations.

11. The method of claim 10, further comprising:
in response to determining the EP switch has transitioned between the first state and the second state, setting the EP state associated with each EP source, of the plurality of EP sources that are plugged in, based on the highest EP state of the plurality of EP states,
wherein in response to the highest EP state of the plurality of EP states being the general operations state, setting the EP state associated with each EP source, of the plurality of EP sources that are plugged in, to the available state or the ground handling state, and
wherein in response to the highest EP state of the plurality of EP states being the available state or the ground handling state, setting the EP state associated with each EP source, of the plurality of EP sources that are plugged in, to the general operations state.

12. The method of claim 11, further comprising, in response to said setting the EP state associated with each EP source, of the plurality of EP sources that are plugged in, based on the highest EP state of the plurality of EP states:
controlling power distribution of the plurality of EP sources based on the EP state associated with each EP source from the plurality of EP sources.

13. The method of claim 12, wherein controlling the power distribution of the plurality of EP sources comprises controlling a plurality of controllers to enable a plurality of power bus circuits to direct power distribution to a plurality of electrical systems based on a plurality of EP states that are each associated with one EP source from the plurality of EP sources, and
wherein the plurality of controllers comprise a control unit, a system controller, a bus power control unit, a generator control unit, and an electrical load management system controller.

14. The method of claim 10, wherein the EP indicator comprises:
an on indication that is illuminated to indicate that at least one of the plurality of EP sources is in a general operations state; and
an available indication that is illuminated to indicate that none of the plurality of EP sources are in a general operations state and that at least one of the plurality of EP sources is in an available state or in a ground handling state,
wherein controlling the EP indicator based on the highest EP state comprises illuminating or extinguishing the on indication or the available indication based on the plurality of EP states.

15. The method of claim 10, further comprising:
determining that a first EP source of the plurality of EP sources has been plugged in; and
in response to determining that the first EP source has been plugged in, setting the EP state that is associated with the first EP source to be the higher state of an available state or the highest EP state.

16. The method of claim 9, wherein the plurality of EP sources comprise a plurality of EP sources for an aircraft, wherein the EP switch comprises a single EP switch in the aircraft, and
wherein the EP indicator of the EP switch is in the aircraft.

17. A method to control a plurality of external power ("EP") sources, the method comprising:
determining a plurality of EP states, each EP state of the plurality of EP states being associated with one EP source from the plurality of EP sources;
determining a highest EP state of the plurality of EP states;
determining that a first EP source from the plurality of EP sources has been plugged in; and
in response to determining that the first EP source has been plugged in, setting an EP state that is associated with the first EP source based on the highest EP state; and
in response to setting the EP state that is associated with the first EP source, controlling power distribution of the plurality of EP sources based on the EP state associated with each EP source from the plurality of EP sources,
wherein the plurality of EP sources are each capable of being in an off state, an available state, a ground handling state, and a general operations state, and
wherein the general operations state is a higher state than the ground handling state, which is a higher state than the available state, which is a higher state than the off state.

18. The method of claim 17, further comprising controlling an EP indicator based on the highest EP state,
wherein each EP state of the plurality of EP states comprises one of: the off state; the available state; the ground handling state; or the general operations state,
wherein the off state indicates an associated EP source is not plugged in or has a power quality that is outside a no-trip limit,
wherein the available state indicates that an associated EP source is plugged in, has a power quality that is within the no-trip limit, and has no load,
wherein the ground handling state indicates that an associated EP source is plugged in, has a power quality within the no-trip limit, and is powering ground handling,
wherein the general operations state indicates an associated EP source is plugged in, has a power quality within the no-trip limit, and is powering general operations,
wherein the EP indicator comprises:
an on indication that is illuminated to indicate that at least one of the plurality of EP sources is in a general operations state; and
an available indication that is illuminated to indicate that none of the plurality of EP sources are in a general operations state and that at least one of the plurality of EP sources is in an available state or in a ground handling state, and
wherein controlling the EP indicator based on the highest EP state comprises illuminating or extinguishing the on indication or the available indication based on the plurality of EP states.

19. The method of claim 18, further comprising:
determining that the EP switch has transitioned between the first state and the second state;
in response to determining that the EP switch has transitioned between the first state and the second state, setting the EP state associated with each EP source from the plurality of EP sources; and
in response to setting the EP state associated with each EP source, controlling power distribution of the plurality of EP sources based on the EP state associated with each EP source from the plurality of EP sources.

20. The method of claim 19, wherein the plurality of EP sources comprise a plurality of EP sources for an aircraft,
  wherein the EP switch comprises a single EP switch in the aircraft, and
  wherein the EP indicator of the EP switch is in the aircraft.

\* \* \* \* \*